United States Patent Office 3,652,684
Patented Mar. 28, 1972

3,652,684
PREPARATION OF ALCOHOLS
Louis Schmerling, Riverside, and Robert A. Dombro, Chicago, Ill., assignors to Universal Oil Products Company, Des Plaines, Ill.
No Drawing. Continuation-in-part of application Ser. No. 668,693, Sept. 18, 1967. This application May 4, 1970, Ser No. 34,554
Int. Cl. C07c 35/02, 35/08
U.S. Cl. 260—617 R                   9 Claims

ABSTRACT OF THE DISCLOSURE

A primary, secondary, or tertiary alcohol may be prepared by the hydrolysis of a cycloalkanesulfonic acid or salt thereof at elevated temperatures using an alcoholic alkali medium.

CROSS REFERENCE TO RELATED APPLICATIONS

This application is a continuation-in-part application of our co-pending application, Ser. No. 668,693 filed Sept. 18, 1967, now Pat. No. 3,551,504.

This invention relates to a proces for preparing alcohols, and particularly for a process for preparing primary, secondary, and tertiary alcohols by utilizing a hydrocarbonsulfonic, and specifically a cycloalkanesulfonic acid, or salt thereof as a starting material.

Alcohols, whether they be primary, secondary, or tertiary in nature, are important intermediates in the preparation of many chemical compounds. For example, cycloalkyl alcohols may be useful in varied chemical reactions. In a particular instance, cyclopentanol (cyclopentyl alcohol) may be used as a special perfume and pharmaceutical solvent, as an intermedate for dyes, pharmaceuticals and other organic compositions of matter. Likewise, cyclohexanol (cyclohexyl alcohol) may be used in soap making to incorporate solvents therein, in the manufacture of celluloids, as a source of adipic acid for nylon, in textile finishings, as a solvent for rubber, nitrocellulose, resins, metallic soaps, dyes, vegetable, essential and mineral oils, cellulose esters and ethers; as a blending agent, etc. may also be used in lacquers, paints, varnishes, varnish removers, dry cleaning, leathers degreasing, polishes, solvent mixtures, plasticizers, germicides, etc.

Heretofore, the prior art has disclosed the reaction of alkanesulfonic acids at elevated temperatures in aqueous alkali solutions. Three reactions were postulated as to what should occur when a sodium alkanesulfonates was heated with aqueous sodium hydroxide. These reactions are as follows:

(1) $RCH_2CH_2SO_3Na + NaOH \rightarrow RCH=CH_2NaHSO_3$
(2) $RCH_2CH_2SO_3Na + NaOH \rightarrow RCH_2CH_3 + Na_2SO_4$
(3) $RCH_2CH_2SO_3Na + NaOH$
$\rightarrow RCH_2CH_2OH + Na_2SO_3$ It is reported in the prior art that when n-alkanesulfonates ranging from methane to hexane sulfonates were heated with aqueous sodium hydroxide at a temperature ranging from about 317° to about 375° C. neither olefin nor alcohol was obtained. In addition, acidification of the solutions resulting from sodium butane- and pentanesulfonates gave odors of butyric and valeric acids which were not isolated. Subsequently it was reported that repetition of this prior art reaction showed that the action of aqueous sodium hydroxide on the alkanesulfonates at 350° C. results exclusively in a bimolecular β-elimination reaction with the formation of the olefin, that is Equation 1 above; the first investigator had evidently overlooked the olefin due to his method of analysis of the product. However, in contradistinction to the reported results set forth in the prior art, the utilization of an alcoholic alkali medium in the hydrolysis of an cycloalkanesulfonic acid will result in the formation of an alcohol, rather than olefin as the chief component of the reactant product.

It is, therefore, an object of this invention to provide a process for preparing alcohols.

A further object of this invention is to provide a process for preparing alcohols utilizing a hydrocarbonsulfonic acid and particularly a cycloalkanesulfonic acid or salt thereof as a starting material.

In one aspect an embodiment of this invention resides in a process for the preparation of alcohol which comprises subjecting a cycloalkanesulfonic acid or an alkali, alkaline earth or Group III metal salt thereof to hydrolysis, at a temperature in the range from about 100° to about 300° C. and a pressure sufficient to maintain a major portion of the reactants in the liquid phase, in an alcoholic alkali medium containing from about 10 to about 70 wt. percent of an alkali selected from the group consisting of alkali metal hydroxides and alkaline earth metal hydroxides, the alcoholic portion of said medium being selected from the group consisted of anhydrous lower alkanols and aqueous lower alkanols containing up to about 50% water, and recovering the resultant alcohol.

A specific embodiment of this invention is found in the preparation of a process of an alcohol which comprises subjecting cyclohexanesulfonic acid to hydrolysis at a temperature in the range of from about 100° to about 300° C. and a pressure sufficient to maintain a major portion of the reactant in the liquid phase in the presence of a medium comprising a sodium hydroxide-ethyl alcohol solution, and recovering the resultant cyclohexanol.

Other objects and embodiments will be found in the following further detailed description of the present invention.

As hereinbefore set forth the present invention is concerned with the process for preparing alcohols utilizing a cycloalkanesulfonic acid as the starting material. For the purpose of this invention, the term "cycloalkanesulfonic acid" as used in the present specification and appended claims will refer to and encompass the cycloalkanesulfonic acids, alkylcycloalkanesulfonic acids, cycloalkylalkanesulfonic acids, alkylcycloalkylalkanesulfonic acids as well as salts thereof. The alcohol is prepared by subjecting the aforementioned cycloalkanesulfonic acid to hydrolysis in the presence of an alcoholic alkali medium at elevated temperatures ranging from about 100° up to about 300° C. In addition, it is also contemplated that the hydrolysis conditions will include pressures of about atmospheric. However, if so desired, superatmospheric pressures ranging from 2 to about 50 atmospheres or more may be used to maintain a major portion of the reactants in the liquid phase, said pressure being the pressure generated by the reactants at the reaction temperature or that effected by the introduction of a substantially inert gas such as nitrogen into the reaction vessel.

Examples of cycloalkanesulfonic acids and salts thereof which are to be utilized in the process of this invention include, in particular, said acids as well as alkali, alkaline, earth or Group III metal salts thereof. Specific examples of these compounds will include:

cyclopentanesulfonic acid,
cyclohexanesulfonic acid,
cycloheptanesulfonic acid,
cyclooctanesulfonic acid,
a methylcyclopentanesulfonic acid,
a methylcyclohexanesulfonic acid,
cyclopentylmethanesulfonic acid,
cyclohexylmethanesulfonic acid,
cycloheptylmethanesulfonic acid, cyclooctylmethanesulfonic acid,
2-cyclopentylethanesulfonic acid,
2-cyclohexylethanesulfonic acid,
2-cycloheptylethanesulfonic acid,
2-cyclooctylethanesulfonic acid,
3-cyclopentylpropanesulfonic acid,
3-cyclohexylpropanesulfonic acid,
3-cycloheptylpropanesulfonic acid,
3-cyclooctylpropanesulfonic acid,
4-cyclopentylbutanesulfonic acid,
4-cyclohexylbutanesulfonic acid,
4-cycloheptylbutanesulfonic acid,
4-cyclooctylbutanesulfonic acid,
(2-methylcyclopentyl)methanesulfonic acid,
(3-methylcyclopentyl)methanesulfonic acid,
(2-ethylcyclopentyl)methanesulfonic acid,
(2-methylcyclohexyl)methanesulfonic acid,
(3-methylcyclohexyl)methanesulfonic acid,
(4-methylcyclohexyl)methanesulfonic acid,
(2-methylcycloheptyl)methanesulfonic acid,
(3-methylcycloheptyl)methanesulfonic acid,
(4-methylcycloheptyl)methanesulfonic acid,
(2-methylcyclooctyl)methanesulfonic acid,
(3-methylcyclooctyl)methanesulfonic acid,
(4-methylcyclooctyl)methanesulfonic acid,
(5-methylcyclooctyl)methanesulfonic acid,
2-(2-methylcyclopentyl)ethanesulfonic acid,
2-(3-methylcyclopentyl)ethanesulfonic acid,
2-(2-ethylcyclopentyl)ethanesulfonic acid,
sodium cyclopentanesulfonate,
sodium cycloheptanesulfonate,
sodium cyclopentylmethanesulfonate,
sodium cycloheptylmethanesulfonate,
sodium 2-cyclopentylethanesulfonate,
sodium 2-cycloheptylethanesulfonate,
sodium 3-cyclopentylpropanesulfonate,
sodium 3-cycloheptylpropanesulfonate,
sodium 4-cyclopentylbutanesulfonate,
sodium 4-cycloheptylbutanesulfonate,
sodium (2-methylcyclopentyl)methanesulfonate,
sodium (3-methylcyclopentyl)methanesulfonate,
sodium (3-methylcyclohexyl)methanesulfonate,
sodium (2-methylcycloheptyl)methanesulfonate,
sodium (4-methylcycloheptyl)methanesulfonate,
sodium (3-methylcyclooctyl)methanesulfonate,
sodium 2-(2-methylcyclopentyl)ethanesulfonate,
sodium 2-(3-methylcyclopentyl)ethanesulfonate,
potassium cyclohexanesulfonate,
potassium cyclooctanesulfonate,
potassium cyclohexylmethanesulfonate,
potassium cyclooctylmethanesulfonate,
potassium 2-cyclohexylethanesulfonate,
potassium 2-cyclooctylethanesulfonate,
potassium 3-cyclohexylpropanesulfonate,
potassium 3-cyclooctylpropanesulfonate,
potassium 4-cyclohexylbutanesulfonate,
potassium 4-cyclooctylbutanesulfonate,
potassium (3-methylcyclopentyl)methanesulfonate,
potassium (2-methylcyclohexyl)methanesulfonate,
potassium (3-methylcyclohexyl)methanesulfonate,
potassium (3-methylcycloheptyl)methanesulfonate,
potassium (2-methylcyclooctyl)methanesulfonate,
potassium (3-methylcyclooctyl)methanesulfonate,
potassium 2-(2-methylcyclopentyl)ethanesulfonate,
calcium cyclopentanesulfonate,
calcium cycloheptanesulfonate,
calcium cyclopentylmethanesulfonate,
calcium cycloheptylmethanesulfonate,
calcium 2-cyclopentylethanesulfonate,
calcium 2-cycloheptylethanesulfonate,
calcium 3-cyclopentylpropanesulfonate,
calcium 3-cycloheptylpropanesulfonate,
calcium 4-cyclopentylbutanesulfonate,
calcium 4-cycloheptylbutanesulfonate,
calcium (2-methylcyclopentyl)methanesulfonate,
calcium (3-methylcyclopentyl)methanesulfonate,
calcium (3-methylcyclohexyl)methanesulfonate,
calcium (2-methylcycloheptyl)methanesulfonate,
calcium (3-methylcycloheptyl)methanesulfonate,
calcium (3-methylcyclooctyl)methanesulfonate,
calcium 2-(2-methylcyclopentylethanesulfonate,
calcium 2-(3-methylcyclopentyl)ethanesulfonate,
magnesium cyclohexanesulfonate,
magnesium cyclooctanesulfonate,
magnesium cyclohexylmethanesulfonate,
magnesium cyclooctylmethanesulfonate,
magnesium 2-cyclohexylethanesulfonate,
magnesium 2-cyclooctylethanesulfonate,
magnesium 3-cyclohexylpropanesulfonate,
magnesium 3-cyclooctylpropanesulfonate,
magnesium 4-cyclohexylbutanesulfonate,
magnesium 4-cyclooctylbutanesulfonate,
magnesium (3-methylcyclopentyl)methanesulfonate,
magnesium (2-methylcyclohexyl)methanesulfonate,
magnesium (3-methylcyclohexyl)methanesulfonate,
magnesium (3-methylcycloheptyl)methanesulfonate,
magnesium (2-methylcyclooctyl)methanesulfonate,
magnesium (4-methylcyclooctyl)methanesulfonate,
magnesium 2-(3-methylcyclopentyl)ethanesulfonate,
aluminum cyclopentanesulfonate,
aluminum 2-cyclohexylethanesulfonate, etc.

In general compounds in which the sulfur is attached to a primary or secondary carbon atom are the preferred sulfonic acids or salts thereon. Compounds in which the sulfur is attached to a tertiary carbon atom (e.g. 1-alkylcycloalkanesulfonic acids, 1 - cycloalkyl - 1 - alkylalkanesulfonic acids, etc., and salts thereof) may also be used, but not necessarily with equivalent results. It is to be understood that the aforementioned substituted sulfur containing compounds are only representatives of the class of compounds which may undergo hydrolysis in an alcoholic alkali medium, and that the present invention is not necessarily limited thereto.

It is also contemplated within the scope of this invention that hydrocarbonsulfinic and hydrocarbonsulfenic acids and salts thereof which are similar in configuration to the aforementioned hydrocarbonsulfonic acids and salts thereof may also be used in the present invention. However, the hydrocarbonsulfonic acids or salts thereof constitute the preferred reactants inasmuch as these compounds are more readily available and correspondingly more inexpensive than are the hydrocarbonsulfenic and hydrocarbonsulfinic acids and salts thereof.

The alcoholic alkali medium in which the process of this invention is effected comprises a mixture of an alcohol, water and an alkali compound such as sodium hydroxide, lithium hydroxide, rubidium hydroxide, cesium hydroxide, magnesium hydroxide, calcium hydroxide, strontium hydrooxide, etc., the hydroxides being present in the mixture in an amount in the range of from about 10 wt. percent up to about 70 wt. percent; in general, hydroxides which are soluble in alcohol or aqueous alcohol are preferred. The alcoholic portion of the medium is provided for by the presence of methyl alcohol, ethyl alcohol, n-propyl alcohol, isopropyl alcohol, butyl alcohol, etc., the preferred alcohol being ethyl alcohol. The alcohol may contain up to about 50% of water, water being particularly useful in causing more rapid and complete solution of the hydroxide.

The process of this invention may be effected in any suitable manner and may comprise either a batch or continuous type operation. For example, when a batch type operation is used, a quantity of the sulfonic acid or salt thereof is placed in an appropriate reaction apparatus. The alcoholic or aqueous-alcoholic alkali medium is also added to the reaction vessel which is thereafter heated to the desired operating temperature. The reaction is allowed to proceed at the desired temperature for a predetermined period of time which may range from about 0.5 up to about 10 hours or more. In addition, if so desired, when utilizing an apparatus such as a rotating autoclave, the reaction may be effected under a pressure which is provided for by the introduction of an inert gas such as nitrogen to the reaction apparatus. Upon completion of the desired residence time the apparatus and contents thereof are allowed to cool to room temperature. In the event that the reaction has been run under superatmospheric pressure any excess pressure that may be present is vented and the reaction mixture is recovered. The reaction product is then treated in a conventional manner such as fractional distillation, crystallization or other separation means whereby the desired alcohol which may be primary, secondary, or tertiary in nature is recovered from the reaction mixture, the latter comprising unreacted sulfur containing compounds, by-product and alcoholic alkali medium.

It is also contemplated within the scope of this invention that the process may be effected in a continual manner. The sulfonic acid or salt thereof is continuously charged to a reaction vessel which is maintained at the proper operating conditions of temperature and pressure. The alcoholic or aqueous-alcoholic alkali meidum is also continuously charged thereto through separate means, having been premixed prior to entry into said reactor. Alternatively, an aqueous alkali solution and the alcohol may be charged to the reactor through separate lines or, if so desired, one or both may be admixed with the sulfonic acid or salt thereof prior to entry into said reactor and the mixture charged thereto in a single stream. After a predetermined residence time has elaspsed, the reactor effluent is continuously discharged from the reaction zone and subjected to a separation step whereby the desired alcohol is separated from unreacted charge stock, alcoholic alkali medium and any by-product which may have formed, the former two components being recycled to the reaction zone to form a portion of the feed stock.

The following examples are given to illustrate the process of the present invention. They are not, however, intended to limit the generally broad scope of the present invention in strict accordance therewith.

EXAMPLE I

A mixture consisting of 0.1 mole of cyclohexanesulfonic acid, 0.2 mole of sodium hydroxide and 150 cc. of ethyl alcohol is placed in a glass liner of a rotating autoclave which is thereafter sealed and nitrogen is pressed in until an initial pressure of 25 atmospheres is reached. Following this the autoclave is then heated to a temperature of about 150° C. and maintained at a temperature ranging from 150° to 200° C. for a period of 5 hours. At the end of this time, the autoclave and contents thereof are allowed to return to room temperature, the excess pressure is discharged, the reaction production is recovered from the autoclave, and the unreacted cyclohexanesulfonic acid is separated from the reaction mixture. The ethyl alcohol solvent is removed by distillation and the residue is diluted by water. The alkaline solution is extracted with ether following which the ether is removed by a vacuum and the residue is fractionated by distillation. The desired product comprising cyclohexanol is recovered by means of this distillation.

EXAMPLE II

In this example a mixture of 0.1 mole of sodium cyclohexanesulfonate, 0.2 mole of sodium hydroxide and 150 cc. of absolute ethyl alcohol is placed in the glass liner of a rotating autoclave which is thereafter sealed and nitrogen pressed in until an initial pressure of 30 atmospheres is reached. The autoclave is then heated to a temperature of 150° C. and maintained in a range of from 150° to 200° C. for a period of 5 hours. At the end of this time, heating is discontinued, the autoclave is allowed to return to room temperature, and the excess pressure is discharged. The autoclave is opened, the reaction product is recovered, and the unreacted sodium cyclohexanesulfonate is filtered off. The filtrate is then subjected to distillation to remove the ethyl alcohol solvent, the residue is diluted with water and extracted with ether. Thereafter the ether is removed in vacuo. The residue is fractionated by distillation and analysis of certain fractions by means of Gas-Liquid Chromatography (GLC), Nuclear Magnetic Resonance (NMR), and Infra-Red (IR) will disclose the presence of cyclohexanol.

EXAMPLE III

A mixture consisting of 0.05 moles of potassium cycloheptanesulfonate, 0.2 mole of sodium hydroxide and 150 cc. of an aqueous alcoholic solution containing 90 wt. percent of n-propyl alcohol and 10 wt. percent of water is placed in a glass liner of a rotating autoclave. The autoclave is sealed, nitrogen is pressed in until an initial operating pressure of 30 atmospheres is reached. Thereafter the autoclave and contents thereof are heated to a temperature of 150° C. and maintained at a range of from 150° to 200° C. for a period of 5 hours. Following the completion of the desired residence time, the autoclave and contents thereof are allowed to return to room temperature, the excess pressure is discharged, and the reaction product is recovered. The unreacted potassium cycloheptanesulfonate is separated by means of filtration and the filtrate is distilled to remove the propyl alcohol. The residue from the distillation is diluted with water and extracted with ether. The extract is separated and the ether is removed by vacuum. Fractional distillation of the residue will result in the recovery of the desired product which is cycloheptanol.

EXAMPLE IV

In this example, a mixture consisting of 0.1 mole of magnesium cyclohexylmethansulfonate, 0.2 mole of sodium hydroxide and 150 cc. of an aqueous alcoholic solution comprising 91 wt. percent ethyl alcohol and 9 wt. percent of water is placed in a glass liner of a rotating autoclave, the autoclave is sealed, nitrogen pressed in until an initial operating pressure of 25 atmospheres is reached, and the autoclave thereafter is heated to a temperature of 150° C. After maintaining the autoclave at a temperature ranging from 150° to 200° C. for a period of 5 hours, heating is discontinued. After returning to room temperature, the excess pressure is discharged and the reaction product is recovered. The unreacted magnesium cyclohexylmethanesulfonate is filtered off and the filtrate is treated in a manner similar to that set forth in Example I above. Analysis of the product will disclose the presence of cyclohexylmethanol.

EXAMPLE V

A mixture of 0.1 mole of 2-cyclohexylethanesulfonic acid, 0.2 mole of potassium hydroxide and 150 cc. of absolute ethyl alcohol is placed in the glass liner of a rotating autoclave. The mixture is then treated in a manner similar to that set forth in the above examples, namely, by subjecting the mixture to operating conditions which include a pressure of 30 atmospheres, a temperature in the range of from 150° to 200° C., and a residence time of 5 hours. The reacted product is recovered and also treated in a manner similar to that hereinbefore set forth. Analysis of the distillation fractions by means of GLC, NMR, and IR will disclose the presence of 2-cyclohexylethanol.

We claim as our invention:

1. A process for the preparation of an alcohol which comprises subjecting a cycloalkanesulfonic acid or an alkali, alkaline earth or Group III metal salt thereof to hydrolysis, at a temperature in the range from about 100° to about 300° C. and a pressure sufficient to maintain a major portion of the reactants in the liquid phase, in an alcoholic alkali medium containing from about 10 to about 70 wt. percent of an alkali selected from the group consisting of alkali metal halide and alkaline earth metal hydroxides, the alcoholic portion of said medium being selected from the group consisted of anhydrous lower alkanols and aqueous lower alkanols containing up to about 50% water, and recovering the resultant alcohol.

2. The process as set forth in claim 1 in which said alcoholic alkali medium is a sodium hydroxide-ethyl alcohol solution.

3. The process as set forth in claim 1 in which said alcoholic alkali medium is a sodium hydroxide-propyl alcohol solution.

4. The process as set forth in claim 1 in which said alcoholic alkali medium is a potassium hydroxide-ethyl alcohol solution.

5. The process as set forth in claim 1 in which said cycloalkanesulfonic acid is cyclohexanesulfonic acid and said resultant alcohol is cyclohexanol.

6. The process as set forth in claim 1 in which said alkali metal salt of said cycloalkanesulfonic acid is sodium cyclohexanesulfonate and said resultant alcohol is cyclohexanol.

7. The process as set forth in claim 1 in which said alkali metal salt of said cycloalkanesulfonic acid is potassium cycloheptanesulfonate and resultant alcohol is cycloheptanol.

8. The process as set forth in claim 1 in which said alkaline earth metal salt of said cycloalkanesulfonic acid is magnesium cyclohexylmethanesulfonate and said resultant alcohol is cyclohexylmethanol.

9. The process as set forth in claim 1 in which said cycloalkanesulfonic acid is 2-cyclohexylethanesulfonic acid and said resultant alcohol is 2-cyclohexylethanol.

References Cited
UNITED STATES PATENTS

| | | | |
|---|---|---|---|
| 2,553,576 | 5/1951 | Grosse et al. | 260—632 |
| 2,760,992 | 8/1956 | Schoeffel et al. | 260—628 |
| 3,418,382 | 12/1968 | Dombro | 260—617 R X |
| 3,459,813 | 8/1969 | Dombro | 260—617 R X |
| 3,515,759 | 6/1970 | Dombro | 260—617 R X |

HOWARD T. MARS, Primary Examiner

U.S. Cl. X.R.

260—631 R